United States Patent [19]
Meier et al.

[11] Patent Number: 5,612,990
[45] Date of Patent: Mar. 18, 1997

[54] DIGITAL WIRELESS INTERFACE FOR A BASE STATION FOR ESTABLISHING COMMUNICATION BETWEEN A PLURALITY OF DIGITAL RADIO CHANNELS AND A PLURALITY OF DIGITAL WIRELINE CIRCUITS

[75] Inventors: Rolf G. Meier, Carp; Peter Bligh, Kanata, both of Canada

[73] Assignee: Mitel Corporation, Kanata, Canada

[21] Appl. No.: 211,574

[22] PCT Filed: Oct. 9, 1992

[86] PCT No.: PCT/CA92/00444

§ 371 Date: Apr. 11, 1994

§ 102(e) Date: Apr. 11, 1994

[87] PCT Pub. No.: WO93/07724

PCT Pub. Date: Apr. 15, 1993

[30] Foreign Application Priority Data

Oct. 10, 1991 [CA] Canada .................... 2053137

[51] Int. Cl.[6] ........................................... H04Q 7/30
[52] U.S. Cl. ........................... 379/58; 370/467; 370/524; 379/63
[58] Field of Search .................... 370/24, 29, 60, 370/67, 85.1, 92, 95.3, 110.1, 95.1; 359/114, 123, 135, 185; 379/58, 63; 380/49; 455/54.1, 76, 77, 88, 33.1

[56] References Cited

U.S. PATENT DOCUMENTS

| | | | |
|---|---|---|---|
| 4,993,019 | 2/1991 | Cole et al. | 370/67 |
| 5,001,742 | 3/1991 | Wang | 379/60 |
| 5,007,050 | 4/1991 | Kasparian et al. | 370/77 |
| 5,020,135 | 5/1991 | Kasparian et al. | 455/76 |
| 5,274,694 | 12/1993 | Lechner et al. | 379/63 |
| 5,307,371 | 4/1994 | Juola | 375/1 |
| 5,416,779 | 5/1995 | Barnes et al. | 370/29.1 |
| 5,428,602 | 6/1995 | Kemppainen | 370/18 |
| 5,490,146 | 2/1996 | Walters | 370/95.1 |
| 5,535,424 | 7/1996 | De Seze et al. | 455/33.1 |

FOREIGN PATENT DOCUMENTS

9110333  7/1991  WIPO .................... 379/63

*Primary Examiner*—William Cumming
*Attorney, Agent, or Firm*—Marks & Clerk

[57] ABSTRACT

An apparatus for establishing communication between one or more digital radio channels and one or more digital wireline signals over the digital radio channels, comprising an r.f. unit for transmitting and receiving circuits, a digital interface unit connected to each wireline circuit, a unit for separating incoming signals into bearer channels and signaling information, and a unit for recombining the outgoing bearer channels and signaling information into the appropriate format for transmission over the outgoing medium.

5 Claims, 1 Drawing Sheet

DIGITAL WIRELESS INTERFACE FOR A BASE STATION FOR ESTABLISHING COMMUNICATION BETWEEN A PLURALITY OF DIGITAL RADIO CHANNELS AND A PLURALITY OF DIGITAL WIRELINE CIRCUITS

BACKGROUND OF THE INVENTION

This invention relates to an apparatus for establishing communication between one or more digital radio channels and one or more digital wireline circuits.

DESCRIPTION OF THE PRIOR ART

Wireless telephones, such as cellular telephones, have been developed which employ digital modulation to communicate signaling, voice and synchronization. Such systems require a means of interfacing them to the public wireline network (Public Switch Telephone Network—PSTN). Prior art systems perform this function by converting the digital radio signals to standard analog signals, which are then transmitted to the PSTN.

By performing a digital-to-analog conversion each time data are transmitted between the wireline and wireless networks, many of the advantages of digital signaling are lost. It is accordingly an object of the present invention to alleviate this disadvantage.

PCT/EP90/02258 discloses an arrangement wherein cordless network termination units are connected by digital line to an exchange. However, each termination unit is only capable of handling one incoming line and the capacity of the termination units is therefore limited.

SUMMARY OF THE INVENTION

According to the present invention there is provided an apparatus for establishing communication between one or more digital radio channels and one or more digital wireline circuits, comprising an r.f. unit for transmitting and receiving signals over said digital radio channels, a digital interface unit connected to each wireline circuit, means for separating incoming signals into bearer channels and signaling information, and means for recombining the outgoing bearer channels and signaling information into the appropriate format for transmission over the outgoing medium. DECT, spread spectrum, or other systems can be used for the radio channels.

The invention provides a means of interfacing radio signals to the PSTN (Public Switched Telephone Network) or ISDN (Integrated Services Digital Network) either through a PBX (using a DNIC, for example) or directly, (using a Primary Rate Interface (PRI) or a Base Rate Interface (BRI), for example) while maintaining the advantages of digital encoding of voice and using message-based signaling.

By using a DNIC (Digital Network Interface Circuit) device, it is possible to locate the wireless base station remotely from the switching system in order to optimize the radio coverage of the base stations by allowing flexible location of the base stations.

In one embodiment the interface units, which are standard DNIC units, are connected to a standard ST serial bus. This in turn is connected to a multiplexer/demultiplexer unit, which separates the D (data) channels from the B (bearer) channels. The D channels are then interpreted to extract signaling information, which is passed through UART (Universal Asynchronous Receiver Transmitter) to the r.f. unit, where the signaling information is recombined with the bearer information for onward transmission over the radio channels. The system works in reverse for signals received over the digital radio channels.

The digital wireline circuits are preferably basic rate circuits operating at 192 kbps and offering two bearer (B) channels at 128 kbps and one data (D) channel 16 kbps. The remaining bits are used for control purposes. The r.f. section preferably uses a CT2 standard format.

BRIEF DESCRIPTION OF THE DRAWING

The invention will now be described in more detail, by way of example only, with reference to the accompanying drawings, in which.

DESCRIPTION OF THE PREFERRED EMBODIMENT

Figure 1:
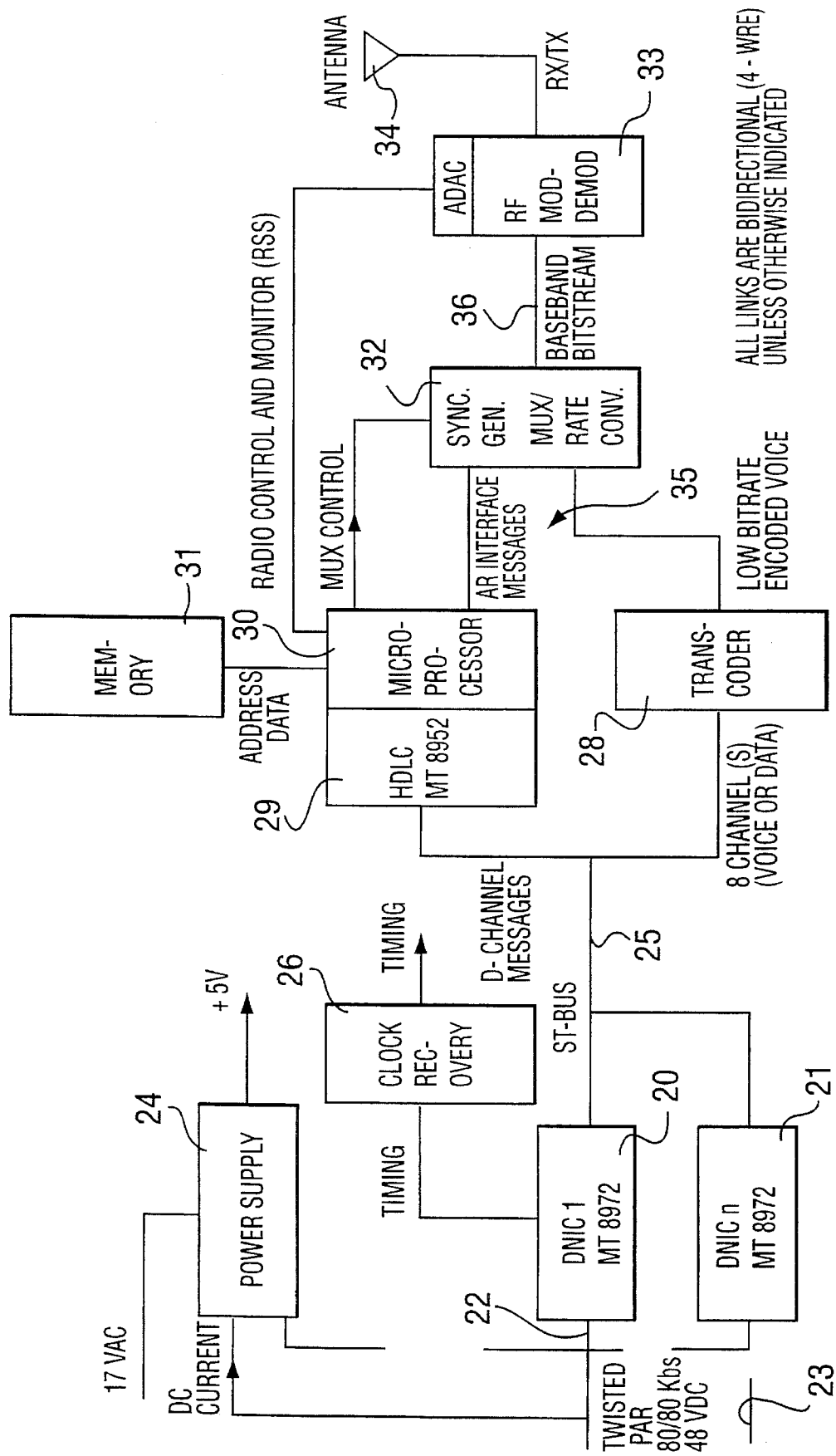
FIG. 1 is a block diagram of an apparatus in accordance with the invention.

Referring now to FIG. 1, a DNIC interface 20, (and optionally additional DNIC interfaces 21) is connected to respective twisted pairs of copper wires 22, 23 carrying data at a rate of 80/160 kbps in full duplex mode for each pair of wires. The base rate channels provide a signaling "D" channel and one or more, usually two, "B" channels carrying voice or data.

The twisted pairs provide a 48 volt DC voltage feed to power supply 24, which is capable of converting the DC appearing on the line into a voltage suitable for powering the apparatus. As an alternative, the power supply 24 can be connected to 117 volts AC supply. Power supply 24 provides a 5 volt output.

The DNICs 20, 21 convert the incoming line code into standard ST bus format and apply it to ST bus 25, which carries a 2.048 mbps stream. The D and B channels can be extracted from this bus according to a predetermined sequence of channel assignments. Other serial bit stream rates can be employed, but the 2.048 standard is most convenient in the context of the present invention.

By connecting multiple DNIC input devices in parallel to the same ST bus, higher bit rates can be achieved. The additional twisted copper pairs can also be used to add additional power to the power supply if more power is required by the station. Each DNIC unit 20, 21 communicates to the remote switching system over a separate twisted pair.

The use of a standard ST bus allows other interfaces to be used instead of DNIC if desired.

The clock recovery block 26 is connected to the DNIC in order to provide the required timing signals to the invention. In particular, the system provides an 8 kHz frame pulse signal, which can be used to generate a synchronization signal for the purpose of synchronizing the operation of multiple base stations.

The voice or data channels are routed to MUX unit 32. In some applications, a voice processing unit 28 is required. This consists of a DSP (Digital Signal Processor), containing a predetermined sequence of operations that are performed on the information stream(s). A typical application would be voice compression, wherein the digitally-encoded voice is reduced in data rate while maintaining high information content, thereby preserving bandwidth on the radio channel.

An example of such an algorithm can be found in the CCITT document G.721.

However, some applications can be implemented without the use of a DSP block, for example if the information stream is already compressed into the format required for the radio interface.

The signaling information on the "D" channel is routed to a HDLC (High-level Data Link control) controller 29, which performs the layer 2 functions of the protocol on the "D" channel. It should be noted that some protocols can be implemented without the use of an HDLC controller, and that this block is included only for reference in the event that the HDLC format is required.

The signaling information on the "D" channel sometimes called "messages", is analyzed by a microprocessor 30. Various functions are performed by the microprocessor on these messages:

1) The messages from a PBX or PSTN are interpreted according to whether they are meant for the base station itself, or for subsequent transmission to the wireless telephone, and similarly, the messages from the wireless telephone are interpreted according to whether they are intended for the base station or for subsequent transmission to the PBX or PSTN. This may be done by means of a message type byte.

2) In the event that the messages are intended for the base station, they are acted on by the processor according to the requirements of the message. An example of such a message might be a request to adjust the output level of the base station.

3) In the event that messages are intended to communicate between the wireless telephone and the PBX or PSTN, the messages are either passed transparently through the base station, or, if required, the messages are changed in format such that they may be interpreted correctly by the intended recipient. This may be done by means of a look-up table, stored in the microprocessor's memory 31.

In addition, the same microprocessor 30 performs the link access protocol as required by the radio interface standard. Such protocols have been defined in a number of standards, such as IETS-300-131 (otherwise known as the CT2 Common Air Interface) and the DECT standard. These standards contain all the algorithms necessary for establishing the radio link, as well as a definition of the air interface messages required for communication with the wireless handset.

The multiplexer/demultiplexer circuit 32 combines and separates the air interface messages 35 and low-bit-rate encoded voice channels 37 such that a single baseband bit stream 36 is available for a radio transceiver. This circuit is under control of the microprocessor in order that the signaling and information channels can be combined according to the sequence required by the radio interface. In addition, this block inserts and decodes a predetermined sequence of "synch" bits, which are used to synchronize the transceiver in the remote terminal with the transceiver in the base station.

The RF (radio frequency) unit 33 is a known module which converts the baseband bit stream into a waveform suitable for transmission and reception by radio by means of an antenna 34. In a typical transceiver, one or more carrier frequencies are available as allowed by the particular air interface standard employed. The carrier frequencies are selected by the microprocessor according to a predetermined sequence which is defined by the air interface standard. In addition the transceiver provides information to the microprocessor on the status of the available carrier frequencies, such as signal strength, and interference. The interface between the microprocessor and the RF block is an A-to-D (analog to digital) and D-to-A (digital to analog) converter (ADAC). The microprocessor 30 may also control the amplitude of the transmitted signal.

While the ST bus is commonly available in the telecommunications industry, another type of bus, such as an IOM bus, can also be employed. A variety of standard devices can be connected to this circuit too.

The protocol converter can be implemented in the firmware of the microprocessor, which controls many of the functions of the apparatus. Initially, protocol conversion may be necessary for the proprietary set software, although in the future the protocols will be transparent, using ISDN entirely. Since the apparatus includes a microprocessor, the same processor can be used for handling the radio link protocol within the r.f. module. This can result in a cost reduction and the elimination of the UART function.

We claim:

1. A base station in a cellular network for establishing communication between one or more digital radio channels and one or more digital wireline circuits, each wireline circuit consisting of one or more bearer channels and a data channel carrying signaling information, comprising:

an r.f. unit for transmitting and receiving signals over said digital radio channels;

a digital interface unit (DNIC) connected to each wireline circuit for converting incoming channels from said wireline circuits to serial bus format, and for converting outgoing channels over said wireline circuits to an appropriate wireline format and;

a common serial bus connected to a plurality of said digital interface units, said bearer and data channels being assigned to appropriate channels on said serial bus;

a microprocessor connected to said serial bus for extracting the data channels and interpreting the signaling information to determine whether it is destined for the base station, said microprocessor responding to digital messages destined for the base station and passing through messages destined for the r.f. unit or wireline circuits; and a multiplexer-demultiplexer unit for interfacing said microprocessor and said serial bus to said r.f. unit.

2. A base station as claimed in claim 1, characterized in that said serial bus is a 2.048 mb/sec ST-bus.

3. A base station as claimed in claim 1, further comprising means for extracting power to supply the apparatus from said wireline circuits.

4. A base station as claimed in claim 2, characterized in that said microprocessor also converts the information between formats appropriate for wireline and r.f. transmission.

5. A base station as claimed in claim 1, further comprising a voice processing unit between said serial bus and said multiplexer-demultiplexer unit.

* * * * *